United States Patent
Sahlqvist

(10) Patent No.: US 6,760,766 B1
(45) Date of Patent: Jul. 6, 2004

(54) DATA TRANSMISSION METHOD AND DEVICE

(76) Inventor: Per Sahlqvist, Pollenvägen 10, S-722 31 Västerås (SE)

( * ) Notice: Subject to any disclaimer, the term of this patent is extended or adjusted under 35 U.S.C. 154(b) by 0 days.

(21) Appl. No.: 09/373,975

(22) Filed: Aug. 16, 1999

Related U.S. Application Data

(60) Provisional application No. 60/097,533, filed on Aug. 21, 1998.

(30) Foreign Application Priority Data

Aug. 21, 1998 (SE) .............................................. 9802820

(51) Int. Cl.⁷ ............................................. G06F 15/16
(52) U.S. Cl. ....................... 709/227; 709/224; 709/228; 709/236; 709/238
(58) Field of Search ................................ 709/227, 232, 709/238, 239, 200, 201, 224, 228, 236, 237

(56) References Cited

U.S. PATENT DOCUMENTS

| | | | | |
|---|---|---|---|---|
| 5,329,521 A | * | 7/1994 | Walsh et al. ................. | 370/225 |
| 5,657,320 A | | 8/1997 | Russ et al. | |
| 5,768,528 A | * | 6/1998 | Stumm ..................... | 379/93.25 |
| 5,845,091 A | | 12/1998 | Dunne et al. | |
| 6,247,058 B1 | * | 6/2001 | Miller et al. ................. | 370/418 |
| 6,324,161 B1 | * | 11/2001 | Kirch ......................... | 370/217 |

FOREIGN PATENT DOCUMENTS

| | | |
|---|---|---|
| EP | 0462540 | 12/1991 |
| WO | WO 98/28924 | 7/1998 |

* cited by examiner

*Primary Examiner*—Ario Etienne
*Assistant Examiner*—Lashonda Jacobs
(74) *Attorney, Agent, or Firm*—Dykema Gossett PLLC

(57) ABSTRACT

A method and device for handling data transmissions in a redundant data network comprising a first network and a second network and a transmission protocol, further comprising a plurality of nodes, of which at least two nodes are each connected to a first network and a second network. The method comprises the steps of sending a first message via a first network and resending the first message when the timeout for receipt of an acknowledgement signal expires. When a timeout expires, the message is resent via the second network by substituting a second route-specific address using the second network in place of said first network. In the preferred embodiment of the invention the transmission protocol TCP/IP is used as the transmission protocol. The advantage is that the method does not increase network traffic and the timeout period may be selected to suit the traffic conditions of particular data networks.

13 Claims, 4 Drawing Sheets

DATA TRANSMISSION METHOD AND DEVICE

This application claims the benefit of U.S. Provisional Application Serial No. 60/097,533, filed Aug. 21, 1998.

TECHNICAL FIELD

The present invention relates to the technical field of data transmission. Devices connected to a data network, whether they are computers, computer workstations, or any other device capable of sending or receiving a signal are referred to as nodes in this description. In particular the present invention relates to data transmission between two nodes on a data network.

TECHNICAL BACKGROUND

Data networks are used universally to transmit information between a very diverse range of computers, automated devices, control devices, telecommunications equipment, display systems and other devices.

It is common practice to have more than one physical connection between devices on a data network. A transmission fault in a network usually stops all traffic and hinders use of all devices connected to that network until the transmission fault has been located and fixed. As errors are so disruptive in industry and commercial organisations, a second physical network connection can be provided between points on a network. Such secondary network connections, where there exists a first network and a second network, either one of which may be redundant at some time, are also called redundant data networks. A computer connected to a data network may also be referred to as a host, as well as node. An application is a term used to describe a program that may run on a host computer or other device with processing capability. Thus an application may run on a host computer connected to a data network and such an application may communicate with other devices or applications running on other devices connected to that data network.

Conventional transmission standards, also called transport protocols, typically provide for an acknowledgement signal to be returned to a sending node on receipt of a message at the intended destination. In this way, the sending application or device is informed that the sent message arrived and no further action is required. If an acknowledgement signal is not received, then action is taken by the transmission protocol to re-transmit the last message.

Thus a known solution for error handling in a redundant data network is to transmit each message simultaneously via each separate route provided by redundant network connections between nodes. The receiving node, or a receiving application at a node discards second copies of any received message. This strategy ensures that a sent message is received almost 100% of the time. However, as half of the transmissions are duplicated messages, this results in a high traffic load to end nodes.

SUMMARY OF THE INVENTION

The object of the invention is to provide a method for handling transmissions without data loss in a redundant data network in a way that does not increase network traffic. A further object of the invention is that transmission errors be handled efficiently and sufficiently quickly. A still further object of the invention is to provide a method that does not require additional action by a message sender. An additional object of the invention is to provide a method which is compatible with contemporary transmission protocols.

These and other objects are achieved according to the invention by a data transmission method and device in a redundant data network as described in the claims. The present invention comprises a method and a device for handling transmissions in a redundant data network, in which at least two nodes are each connected to more than one network. The transmission method comprises the steps that after a message has been sent from one node to another, the time taken before a message acknowledgement is received at the sending node is measured, according to the known art. The present invention comprises that the message is resent to the destination via a second network when a timeout for receipt of the message acknowledgement expires. In an embodiment of the invention this is carried out by substituting a second network address in place of a first network address for the original destination before the retransmission takes place. Thus when a timeout occurs, the original message is automatically re-sent to the original destination via an alternate route over the redundant data network which is expressed as an alternate network address.

The main advantage of the present invention is that it handles transmission errors in a redundant data network without increasing node system load or network traffic. No data is lost, so the resulting redundant data network is fault tolerant. A further advantage of the present invention is that the method is completely invisible to a message sending device or application. This is a great technical advantage because it means that no modification is required to current hardware or to current computer applications. A still further advantage is that recovery from an transmission error may be chosen to take place very quickly, depending on network traffic requirements.

The time before retransmission may be selected in advance to be faster or slower in relation the existing level of network traffic. An additional further advantage of the invention is that a transmission error handling event is visible to a network controller, so that action to investigate or correct a fault can be initiated. As well as the above advantages, another advantage is that a method according to the invention is very useful as it may be used with any device or network that uses a standard transmission protocol.

BRIEF DESCRIPTION OF THE DRAWINGS

The present invention will be described in more detail in connection with the enclosed drawings.

DESCRIPTION OF THE PREFERRED EMBODIMENTS

Figure 1:
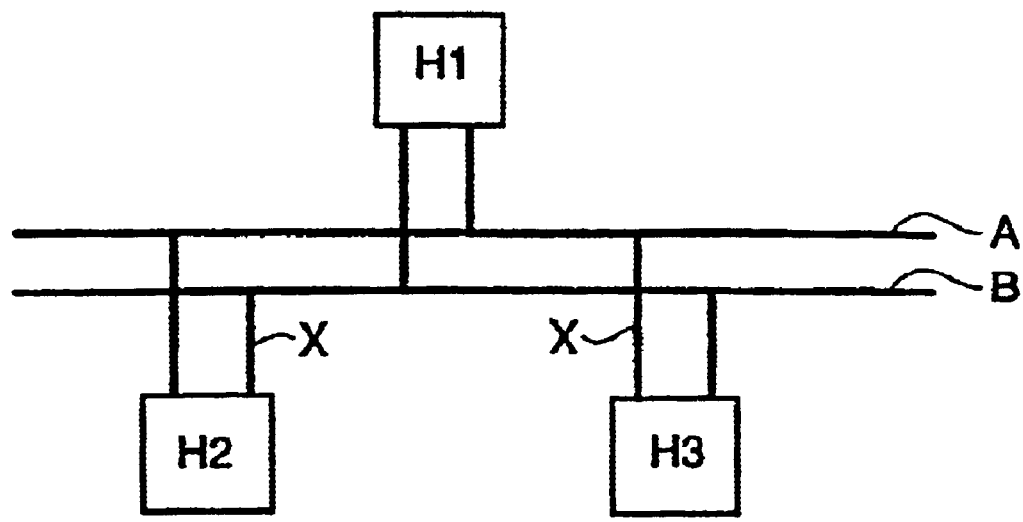
FIG. 1 shows schematically a redundant data network consisting of two networks, network A and network B.

FIG. 1 shows a redundant data network with a first network A and a second network B. Three host computers H1, H2 and H3 are each connected to two networks A, B. A fault in a network leading to a transmission error is shown indicated at a point X. In FIG. 1, H1 must use a route over network A to reach H2 because the connection to network B has failed. H1 must use a route over network B in order to reach host H3, as the connection to network A has failed. When a node or a host has two network connections and two route-specific addresses then nodes can continue to communicate after a failure in one of the two networks.

Figure 2:
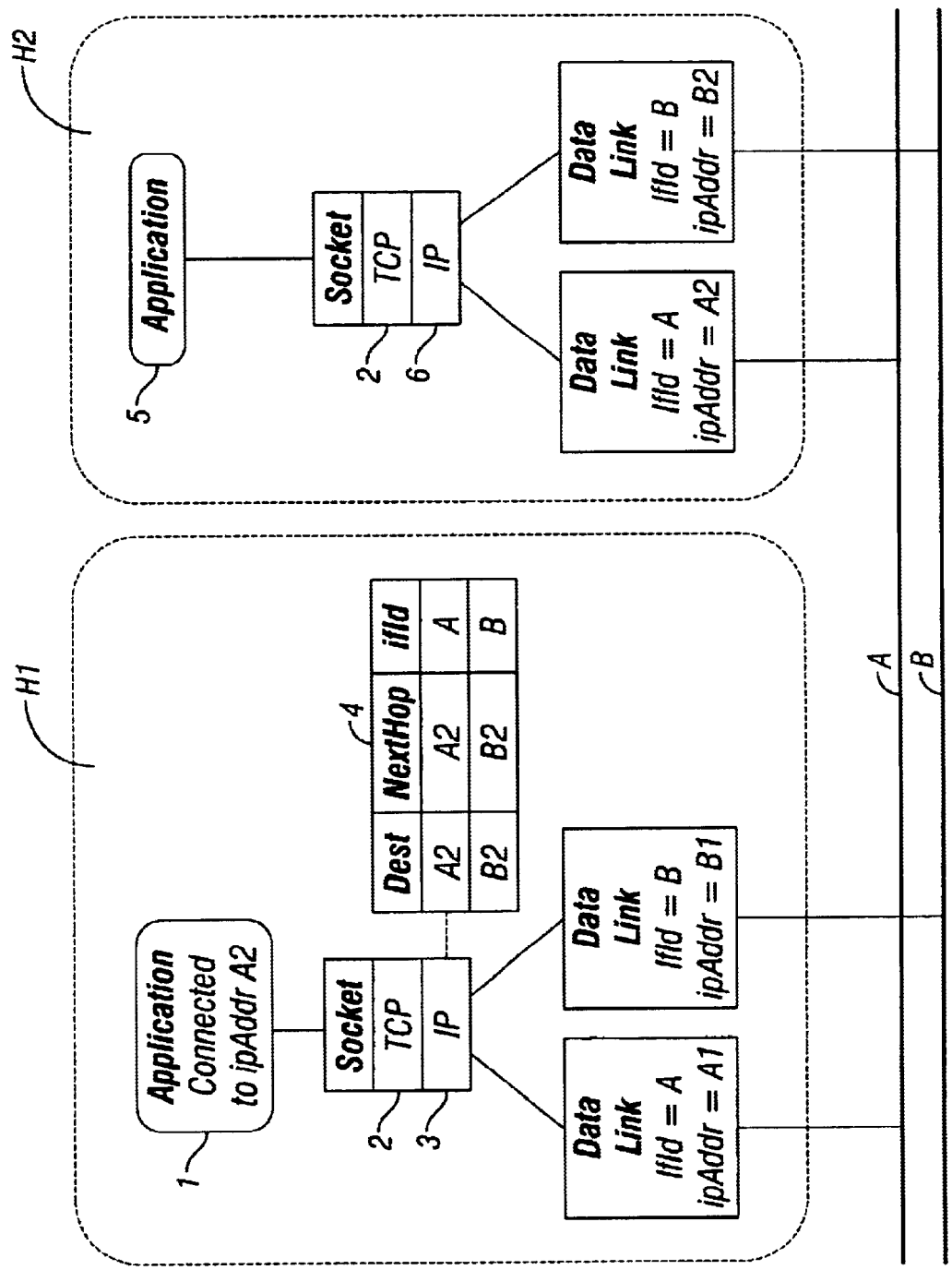
FIG. 2 shows schematically a redundant data network according to the prior art.

FIG. 2 shows two host computers H1 and H2 and a first network A and a second network B. Each host computer has an Application 1, 5. The two hosts H1 and H2 are each connected via two networks A and B. In the example shown the transport protocol used is TCP/IP (Transmission Control Protocol/Internet Protocol). The IP (Internet Protocol) 3 contains a routing table 4. The routing table 4 is shown schematically in FIG. 2. For each node in the network, that is for each possible destination, the routing table contains entries shown listed under Dest, the destination, Next Hop and ifId. Next Hop is a term which may be thought of as meaning the destination of the next transmission of part transmission. Next Hop may also be described as the address of the next router to forward data to the destination. Interface Identity is a reference to the interface used by the route and is shown here abbreviated to ifId. The interface address, the address used by the end user, the Application in this case, is shown abbreviated to ipAddr. A standard operation for two nodes of a redundant data network according to the known art is shown in FIG. 2. In the example, a first Application 1 is located at a first node, Host 1. The first Application 1 is connected to another Application 5 located at a second node, H2. Under normal operation the IP address for H2 from H1 is shown in the IP Routing Table 4 as A2, with the Next Hop address also shown as A2.

Figure 3:
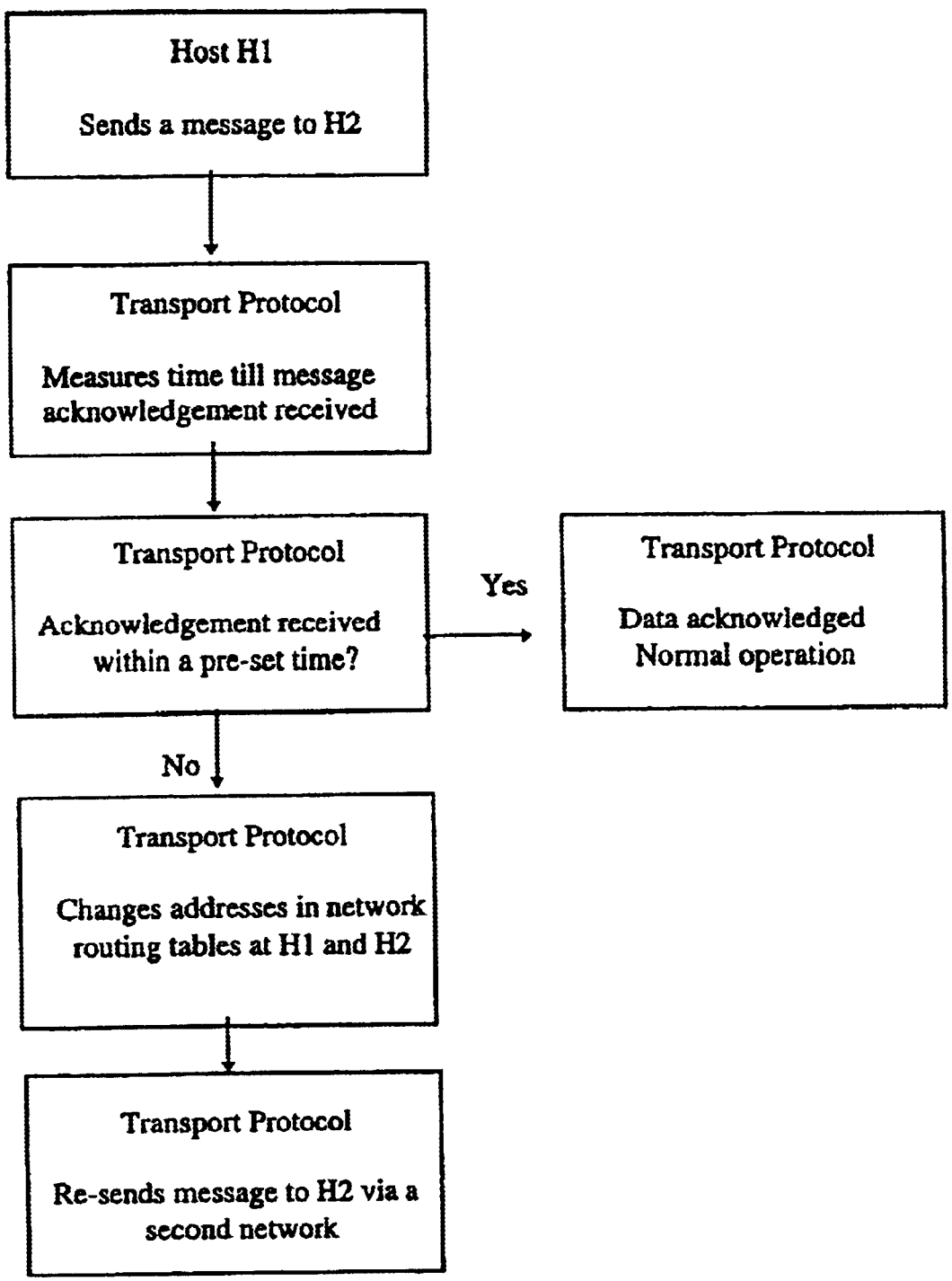
FIG. 3 shows a block diagram for a method of error handling according to the invention.

The block diagram FIG. 3 refers to the host H1 and the Transport Protocol. The block diagram shows schematically the sequence of events when a transmission is handled according to the invention and a transmission error occurs.

In a transmission protocol for a redundant data network, the destination addresses of all nodes or hosts are known and stored. In a preferred embodiment of the invention, a modification is made to the transmission protocol to add a procedure to the re-transmission timeout routine. A re-transmission timeout routine is an instruction in the transmission protocol that re-sends the original message to the original destination address if an acknowledgement signal has not been received for the original message within a specified "timeout" period. The word message is used here to describe data of any type sent from one node to another node. A timeout period may be specified for a particular redundant data network to suit the traffic conditions, that is, so as not to add extra traffic unnecessarily. The timeout period may be selected in reference to the data recovery time of a particular redundant data network or a data recovery time required by one or more applications communicating via the redundant data network.

A modification to the retransmit routine according to the invention substitutes a second route-specific destination address for the original destination just before the timeout period to re-transmission expires. The second route-specific address includes a network route that is different from the network route in the first destination address. When the timeout expires the original message is re transmitted but sent to the second address on the redundant data network. More than one route-specific destination address can exist for each node depending on how many different network connections are installed. A network address is used here to mean a route-specific address. When a second network address is substituted for a first network address, it is the route through a network that is changed, not the end destination address or end node.

In the preferred embodiment of the invention comprising a redundant data network using TCP/IP (Transmission Control Protocol/Internet Protocol), route-specific addresses for all connected nodes are stored in a IP Routing Table. An IP Routing Table is shown schematically as 4 in FIG. 2 and as 7 in FIG. 4. The method according to the invention is implemented by including an extra procedure call in the TCP retransmit time-out routine. The altered TCP retransmit time-out routine consists of the following:

Case TCP_REXMIT_TIMEOUT:

redirect( dest_ip_addr ): /* new attached redirect routine */

Tcp_output( ); /* normal output routine */

The words enclosed between markers /* and */ are comments, not program instructions. In ordinary language what this means is that an extra instruction is added to the re-transmit timeout routine of the transmission protocol TCP. This instruction, which is: redirect( dest_ip_addr ); is an instruction to the IP (Internet Protocol) that the original message to a first route-specific address should be re-directed via a specified second route, that is, via a second network. The redirect function results in the substitution of a second route-specific address for the first address in the IP Routing Table of the sending host and a message to the receiving host to similarly substitute the same second route back to the sending node in the IP Routing Table of the receiving host. When the timeout period elapses the original message is resent to a second destination address via the redundant network with no additional intervention as a result of the fault or the solution.

Figure 4:
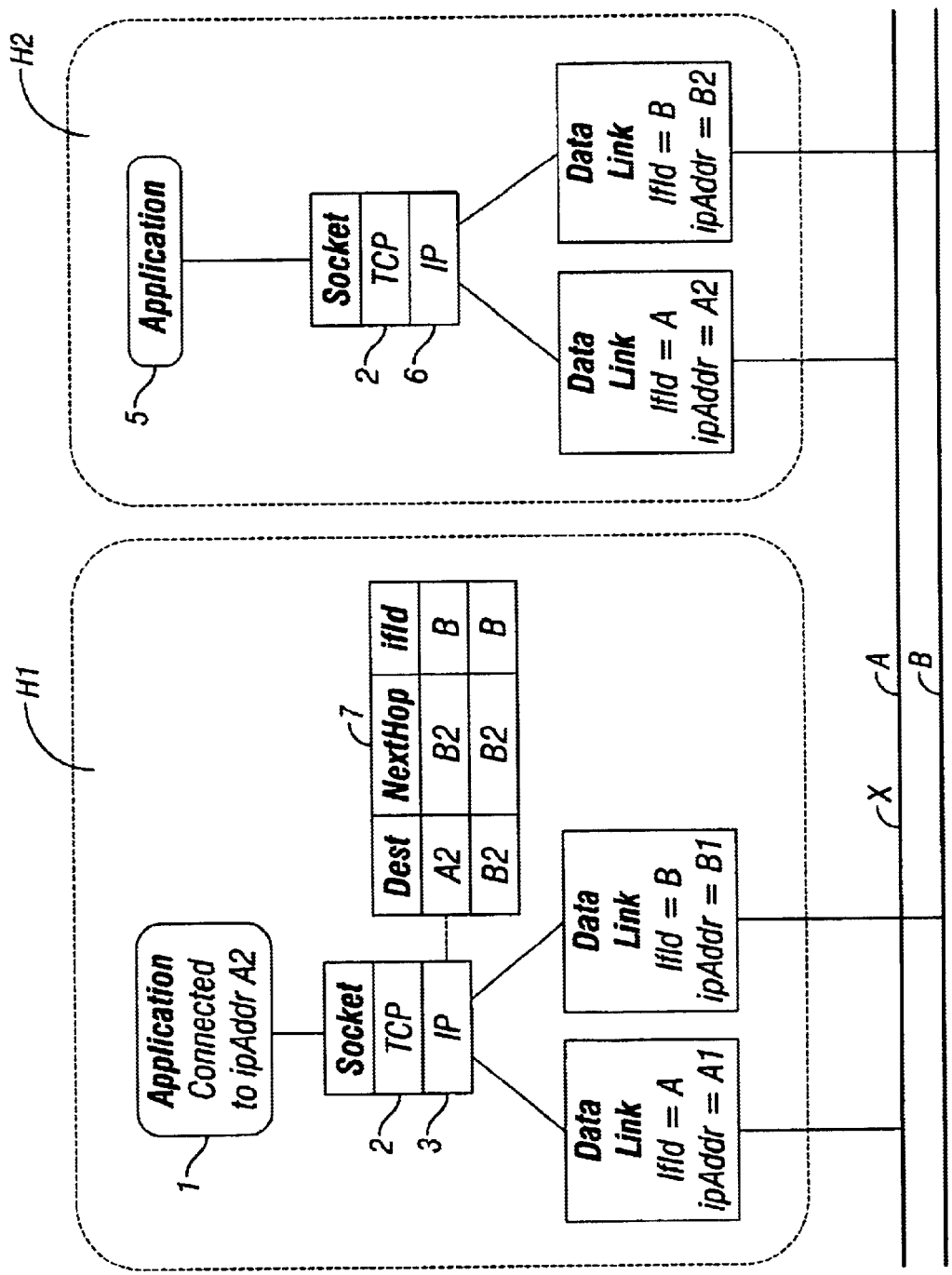
FIG. 4 shows schematically a redundant data network according to the present invention.

FIG. 4 shows the same redundant data network shown in FIG. 2. However in FIG. 4 an error has occurred in network A at a point indicated X and a change according to the invention has been made to the IP routing table 7 of host H1. In this case a second address B2 for the destination of the original message via a second network B, has been substituted in the IP Routing table as the Next Hop at the sending end. The second address B2 is similarly substituted in the IP Routing Table at the receiving end H2 (not shown). This substitution is effected by a part of the TCP/IP transmission protocol called the TCP Timeout Routine which has been altered according to the preferred embodiment of the invention. This results in the redirection of the original message to its destination via a second network without the generation of any significant extra traffic on the network.

The method according to the present invention for use in a fault tolerant redundant data network may be applied to any network or system of connection between two or more devices using a transmission protocol or equivalent, whether the network carries analogue or digital signals, and whether the network comprises network connections that are physical, such as hard-wired electrical, optical or infra-red and radio links as well as virtual connections or addresses, and networks incorporating mixtures of both physical and virtual connections.

What is claimed is:

1. A method for transmitting data from a first node to a second node, each node connected to a first network and a second network, said method comprising the steps of:

sending data first via said first network from said first node to said second node;

resending said data automatically via said second network when a data acknowledgement timeout expires;

providing a transmission protocol comprising the transmission protocol TCP/IP;

changing the TCP/IP protocol by modifying a routine of the protocol that provides for retransmission of data via said second network as the data acknowledgement timeout expires, and selecting a duration of a data acknowledgement signal timeout that elapses before substitution of a second network address for a first network address to suit traffic conditions in a redundant data network.

2. A method according to claim 1, characterised in that said data is resent via said second network by substituting a second route-specific network address using an alternate network in place of a first network address before the timeout for said first data acknowledgement expires.

3. A method according to claim 1, characterised in that a modification made to a TCP/IP retransmit timeout routine comprises an instruction, which is redirect(dest_ip_addr); to redirect the data, causing said first data when retransmitted to be re-transmitted and redirected to said first destination via a second network address or other network address stored for said first destination.

4. A method according to claim 1 for handling transmissions in a redundant data network characterised in that each time that data is retransmitted on an alternative network details of that event are made available to a transmission error log file for fault analysis, fault signalling and subsequent fault correction.

5. Use of a method according to claim 1 for handling transmission in a redundant data network comprising a transmission protocol with a retransmission routine or equivalent, characterised in that a data retransmission timeout routine of the transmission protocol is modified so that a second network address is substituted for a first network address of a destination of a first message in the Routing Table of the sending and receiving nodes before the data acknowledgement timeout expires.

6. A redundant data network comprising a first network and a second network and a transmission protocol, which redundant data network further comprises a plurality of nodes of which at least two nodes are each connected by more than one network, characterised in that said transmission protocol transmits data from a first node to a second node via said first network and when a data acknowledgement timeout expires for said data, said transmission protocol re-sends said data to said second node via said second network;

said transmission protocol comprises the transmission protocol TCP/IP and the TCP/IP protocol is changed by modifying a routine of the protocol that provides for retransmission of data via said second network as the data acknowledgement timeout expires; and the time period that elapses before substitution of a second network address for a first network address is selected to suit the traffic conditions in said redundant data network.

7. A redundant data network according to claim 6, characterised in that said transmission protocol is equipped with means for the substitution of a second network address in place of a first network address, such that the second network address using an alternate network connection such as said second network is substituted for the first network address before a data acknowledgement timeout for retransmission of said data expires.

8. A redundant data network according to claim 5, characterised in that a modification made to said TCP/IP retransmit timeout routine comprises an instruction, which is redirect(dest_ip_addr); to redirect said data, causing said data when retransmitted to be retransmitted and redirected to said first destination via a second network address or other network address stored for said first destination.

9. Use of a redundant data network according to claim 6 for handling transmissions in a redundant data network comprising a transmission protocol with a re-transmission routine or equivalent, characterised in that a data retransmission timeout routine of said transmission protocol is modified so that a second network address is substituted for a first network address of a destination of a first message in the Routing Table of the sending and receiving nodes before a timeout for retransmission of said data elapses.

10. A redundant data network according to claim 6, characterised in that each time that data is retransmitted on an alternative network, details of that event are made available to a transmission error log file for fault analysis, fault signalling and subsequent fault correction.

11. Use of a transmission protocol in a redundant data network according to claim 6, characterised in that the transmission protocol has means such that a second network address may be substituted for a first network address of a destination of a data transmission in the Routing Table of the sending and receiving nodes before a timeout for retransmission of said data elapses.

12. A data carrier comprising digitally encoded information, characterised in that the data carrier comprises information means for modifying a transmission protocol in a redundant data network such that the transmission protocol may resend data first exclusively transmitted via a first network exclusively via a second network on expiration of a data acknowledgement timeout for said data; and the time period that elapses before substitution of a second network address for a first network address is selected to suit the traffic conditions in said redundant data network.

13. A data carrier according to claim 12, characterised in that said information means substitutes a second routespecific address using said second network in place of a first network address using said first network on the expiration of said data acknowledgement timeout for said data.

* * * * *